(12) United States Patent
Oh

(10) Patent No.: US 12,061,808 B2
(45) Date of Patent: Aug. 13, 2024

(54) STORAGE DEVICE FOR TUNING AN INTERFACE WITH A HOST

(71) Applicant: SAMSUNG ELECTRONICS CO., LTD., Suwon-si (KR)

(72) Inventor: Jaerim Oh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 51 days.

(21) Appl. No.: 17/835,761

(22) Filed: Jun. 8, 2022

(65) Prior Publication Data

US 2023/0152993 A1    May 18, 2023

(30) Foreign Application Priority Data

Nov. 15, 2021  (KR) .................. 10-2021-0156418
Feb. 9, 2022   (KR) .................. 10-2022-0016769

(51) Int. Cl.
*G06F 3/06*   (2006.01)
*G06F 13/12*  (2006.01)

(52) U.S. Cl.
CPC .......... *G06F 3/0634* (2013.01); *G06F 3/0604* (2013.01); *G06F 3/0673* (2013.01); *G06F 13/126* (2013.01)

(58) Field of Classification Search
CPC .... G06F 3/0634; G06F 3/0604; G06F 3/0673; G06F 3/0659; G06F 3/061; G06F 3/0679; G06F 11/1048; G06F 11/27; G06F 13/126; G06F 13/128; G11C 16/10; G11C 16/26; G11C 16/0483
See application file for complete search history.

(56) References Cited

U.S. PATENT DOCUMENTS

| | | |
|---|---|---|
| 7,174,412 B2 | 2/2007 | Lin |
| 7,679,133 B2 | 3/2010 | Son et al. |
| 8,553,466 B2 | 10/2013 | Han et al. |
| 8,559,235 B2 | 10/2013 | Yoon et al. |
| 8,654,587 B2 | 2/2014 | Yoon et al. |
| 9,292,465 B2 | 3/2016 | Trivedi et al. |

(Continued)

FOREIGN PATENT DOCUMENTS

| | | |
|---|---|---|
| JP | 2009-123191 A | 6/2009 |
| KR | 10-2015-0145854 A | 12/2015 |

(Continued)

OTHER PUBLICATIONS

Extended European Search Report in European Appln. No. 22186674.2, dated Mar. 23, 2023, 8 pages.

*Primary Examiner* — Ernest Unelus
(74) *Attorney, Agent, or Firm* — Fish & Richardson P.C.

(57) ABSTRACT

A storage device includes a main non-volatile memory and a controller communicating with a host according to a predetermined interface protocol and controlling the main non-volatile memory. The controller includes a special function register (SFR) storing parameters indicating connection characteristics between the storage device and the host. The controller receives a parameter change command according to the interface protocol from the host, extracts one or more descriptors respectively including an SFR address and a parameter value corresponding to a target parameter to be changed from the parameter change command, and tunes an interface by executing the one or more descriptors to write the parameter value into the SFR.

20 Claims, 10 Drawing Sheets

(56) References Cited

U.S. PATENT DOCUMENTS

| | | | |
|---|---|---|---|
| 9,721,113 B2 | 8/2017 | Park et al. | |
| 9,998,558 B2 | 6/2018 | Sammatshetti | |
| 10,114,555 B2 | 10/2018 | Chang et al. | |
| 10,185,673 B2 | 1/2019 | Yoon | |
| 10,649,674 B2 | 5/2020 | Sasidharan et al. | |
| 10,853,299 B2 | 12/2020 | Bolen et al. | |
| 11,029,748 B2 | 6/2021 | Klacar et al. | |
| 2011/0233648 A1 | 9/2011 | Seol et al. | |
| 2013/0259100 A1 | 10/2013 | Ichikawa | |
| 2016/0299690 A1* | 10/2016 | Jung | G06F 3/0688 |
| 2019/0050022 A1 | 2/2019 | Tzafrir | |
| 2020/0225873 A1* | 7/2020 | Ock | G06F 3/0659 |

FOREIGN PATENT DOCUMENTS

| | | |
|---|---|---|
| KR | 10-2017-0007103 A | 1/2017 |
| KR | 10-2017-0047999 A | 5/2017 |
| KR | 10-2017-0055748 A | 5/2017 |
| KR | 10-2020-0088564 A | 7/2020 |

\* cited by examiner

| Bytes | Description |
|---|---|
| 3:0 | Signature: Validity of Setting |
| 7:4 | Target power cycle: Lower 4 bytes |
| 11:8 | Target power cycle: Upper 4 bytes |
| 20:12 | Descriptor 1 |
| 29:21 | Descriptor 2 |
| ... | ... |
| 317:309 | Descriptor N |
| 319:318 | Reserved |

| Bytes | Description |
|---|---|
| 0 | Group: Defines code block to take effect |
| 4:1 | Address: Device memory map address |
| 8:5 | Value: Data to be written |

STORAGE DEVICE FOR TUNING AN INTERFACE WITH A HOST

CROSS-REFERENCE TO RELATED APPLICATION(S)

This application claims the benefit of priority to Korean Patent Application No. 10-2021-0156418 filed on Nov. 15, 2021, and No. 10-2022-0016769 filed on Feb. 9, 2022, in the Korean Intellectual Property Office, the disclosures of which are incorporated herein by reference in their entireties.

BACKGROUND

The present disclosure relates to a storage device including a non-volatile memory.

Semiconductor memories are classified into volatile memory devices and non-volatile memory devices. Volatile memory devices lose data stored therein when power thereto is cut off, but the non-volatile memory devices may retain data stored therein even in the case that power thereto is cut off. Non-volatile memories include a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM), and the like.

The non-volatile memory is used as a storage device in a computing system. In the computing system, the storage device may communicate with a host device using a predetermined interface protocol.

SUMMARY

Example embodiments provide a storage device communicating with a host device using a predetermined interface protocol and supporting a method capable of setting parameters therein indicating connection characteristics between the storage device and the host upon request from the host.

According to example embodiments, a storage device includes a main non-volatile memory and a controller communicating with a host according to a predetermined interface protocol and controlling the main non-volatile memory. The controller includes a special function register (SFR) storing parameters indicating connection characteristics between the storage device and the host. The controller receives a parameter change command according to the interface protocol from the host, extracts one or more descriptors, respectively including an SFR address and a parameter value corresponding to a target parameter to be changed, from the parameter change command, and tunes an interface by executing the one or more descriptors to write the parameter value into the SFR.

According to example embodiments, a storage device includes a main non-volatile memory and a controller communicating with a host according to a predetermined interface protocol and controlling the main non-volatile memory. The controller includes a special function register (SFR) storing parameters indicating connection characteristics between the storage device and the host. The controller tunes an interface by changing a value of a parameter included in the SFR in response to a parameter change command from the host. The SFR is a region that does not support access by the host under the interface protocol.

According to example embodiments, a storage device includes a main non-volatile memory and a controller communicating with a host using a predetermined interface protocol. The controller controls the main non-volatile memory and includes a special function register (SFR) storing parameters indicating connection characteristics between the storage device and the host. A buffer memory buffers data read from the main non-volatile memory and then provides the buffered data to the controller. A sub non-volatile memory stores data required for an operation of the controller that is directly accessed by the controller using an address. The controller loads a boot loader stored in a boot region of the main non-volatile memory into the buffer memory when power supply is detected, initializes the SFR using the boot loader loaded into the buffer memory, acquires one or more descriptors respectively including an SFR address and a parameter value from the sub non-volatile memory, and tunes an interface by executing the acquired descriptors to update the SFR.

According to example embodiments, a computing system includes a host and a storage device communicating with the host through a predetermined interface protocol to store data from the host. The storage device includes a register storing parameters indicating connection characteristics of the protocol. The host provides a parameter change command to the storage device that includes one or more descriptors respectively including a register address and a parameter value of a target parameter which is to be changed. The storage device receives the parameter change command through the interface between the storage device and the host, decrypts the received parameter change command, extracts the one or more descriptors from the decrypted command, and tunes an interface by executing the extracted descriptors to write the parameter value into the register.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred example embodiments of the present disclosure will be described with reference to the accompanying drawings.

Figure 1:
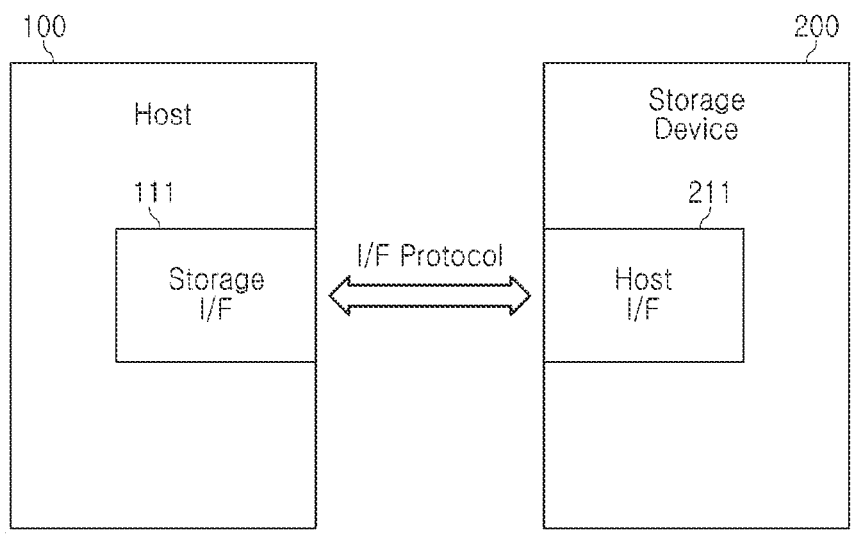
FIG. 1 is a block diagram illustrating a computing system according to an example embodiment of the present disclosure.

FIG. 1 is a block diagram illustrating a computing system according to an example embodiment of the present disclosure.

A computing system 10 may include a host 100 and a storage device 200.

The host 100 may include electronic devices, for example, portable electronic devices such as mobile phones, MP3 players, and laptop computers or various types of electronic devices such as desktop computers, game consoles, TVs, and projectors.

The storage device 200 may communicate with the host 100 to perform an operation under the control of the host 100. The storage device 200 may include a non-volatile memory such as a flash memory, a phase-change random access memory (PRAM), a magnetic random access memory (MRAM), or a resistive random access memory (RRAM). For example, the storage device 200 may be implemented as any one of various types of storage devices such as a solid state drive (SSD), a multimedia card (MMC), an embedded MMC (eMMC), a reduced size MMC (RS-MMC), a micro-MMC, a secure digital (SD) card, a mini-SD card, a micro-SD card, a universal serial bus (USB) storage device, a universal flash storage (UFS) device, a compact flash (CF) card, a smart media card, and a memory stick.

The storage device 200 may communicate with the host 100 according to a predetermined interface protocol. For example, the storage device 200 and the host 100 may communicate with each other according to a peripheral component interconnect express (PCIe) protocol. The host 100 may include a storage interface 111 for communicating with the storage device 200 according to the predetermined interface protocol, and the storage device 200 may include a host interface 211 for communicating with the host 100 according to the predetermined interface protocol.

Various types of electronic devices and storage devices may communicate with each other according to the predetermined interface protocol. Optimal connection characteristics between the host 100 and the storage device 200 communicating with each other may vary depending on various connection environments. For example, a pre-emphasis level and a de-emphasis level for optimizing a signal-to-noise ratio (SNR) of a signal transmitted by the storage device 200 to the host 100 may vary depending on the connection environments.

The storage device 200 may have various parameters defining connection characteristics between the storage device 200 and the host 100. The storage device 200 may optimize the connection characteristics between the storage device 200 and the host 100 by optimizing parameter values. An operation of the storage device 200 for optimizing its connection characteristics may be referred to as an interface tuning operation.

If the storage device 200 can acquire optimized parameter values from the outside and applying the acquired parameter values identically to parameters therein, the storage device 200 may quickly and easily perform interface tuning. For example, a manufacturer (vendor) of the storage device 200 may find optimal parameter values according to the connection environment. Then, if the storage device 200 receives the optimal parameter values transmitted from the outside and applies the received optimal parameter values to parameters therein, the storage device 200 may optimize its connection characteristics without directly finding the optimized parameter values.

The storage device 200 may include a register storing parameter values. The interface protocol for communication between the host 100 and the storage device 200 may not provide an interface for the host 100 to access the register. If the manufacturer needs to produce firmware to which the optimized parameter values are applied and support firmware update in the storage device 200 to apply the optimal parameter values to the storage device 200, it is difficult to apply the optimal parameter values.

According to an example embodiment of the present disclosure, the storage device 200 may support a parameter change command. For example, when the storage device 200 conforms to a non-volatile memory express (NVMe) standard, the parameter change command may be an NVMe administrator (Admin) command. The parameter change command may include one or more descriptors respectively including a register address and a parameter value corresponding to a target parameter to be changed.

When receiving a parameter change command from the host 100, the storage device 200 may tune the interface by writing the parameter value into a region indicated by the register address included in the parameter change command Therefore, even when the host 100 is not allowed to access the register according to the interface protocol, the storage device 200 may tune the interface using the optimal parameter value acquired from the outside.

Figure 2:
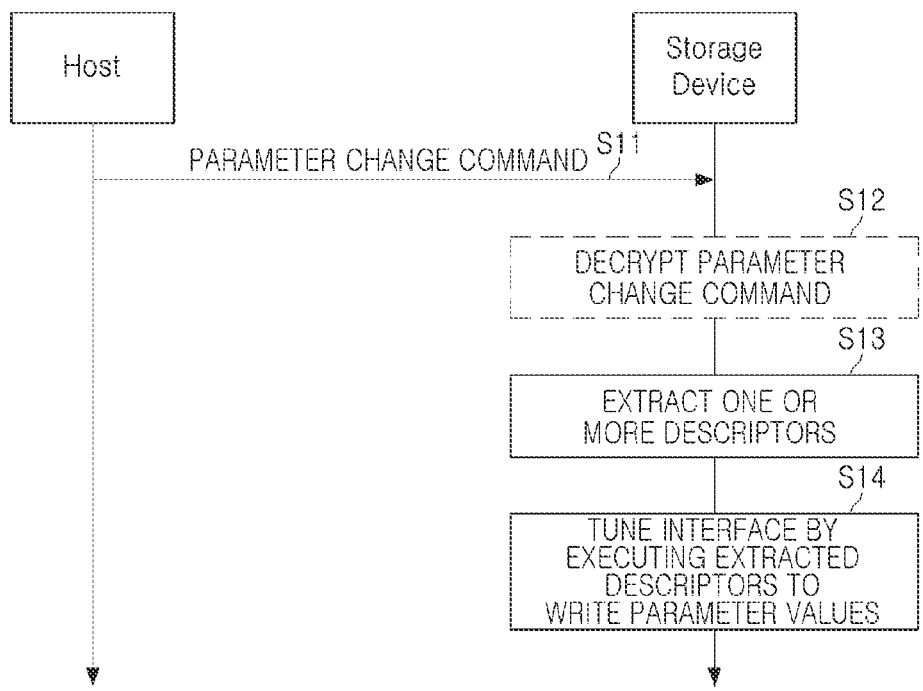
FIG. 2 is a flowchart illustrating an operation of the computing system according to an example embodiment of the present disclosure.

FIG. 2 is a flowchart illustrating an operation of the computing system according to an example embodiment of the present disclosure.

In step S11, the host may provide a parameter change command including one or more descriptors. As described above, each of the descriptors may include a register address and a parameter value corresponding to a target parameter to be changed.

Meanwhile, the optimized parameter value may be determined by the manufacturer. The manufacturer may configure the host to tune the interface between the host and the storage device by generating a parameter change command including the optimized parameter value and transmitting the parameter change command to the host.

In an implementation, the manufacturer may improve the security of parameter and the parameter value by transmitting the parameter change command to the host in an encrypted state. For example, when the storage device conforms to the NVMe standard, the host may provide an encrypted parameter change command to the storage device according to a security protocol supported under the NVMe standard. When receiving the encrypted parameter change command, the storage device may decrypt the parameter change command in step S12.

In step S13, the storage device may extract the one or more descriptors from the parameter change command by parsing the parameter change command.

In step S14, the storage device may perform interface tuning by executing the extracted descriptors and writing the parameter values into the register. For example, the storage device may apply an optimal parameter value to the target parameter by writing the parameter value included into the descriptor in a register region indicated by the register address included in the descriptor.

Hereinafter, a storage device and a parameter change command according to an example embodiment of the present disclosure will be described in more detail with reference to FIGS. 3 to 6.

Figures 3, 4, 5:
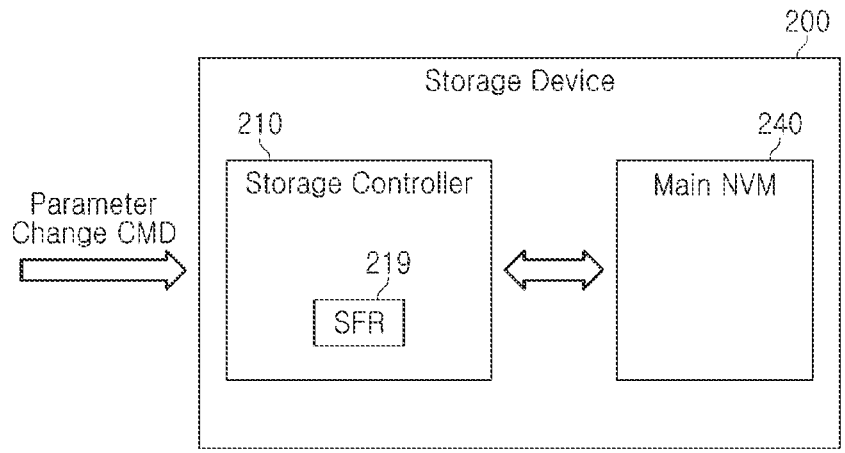
FIG. 3 is a block diagram illustrating a storage device according to an example embodiment of the present disclosure.
FIGS. 4 to 6 are diagrams illustrating a parameter change command according to an example embodiment of the present disclosure.

FIG. 3 is a block diagram illustrating a storage device according to an example embodiment of the present disclosure.

A storage device 200 may correspond to the storage device 200 described with reference to FIG. 1. The storage device 200 may include a storage controller 210 and a main non-volatile memory 240.

The storage controller 210 may control the main non-volatile memory 240 according to a request of a host 100. The storage controller 210 may transmit a control signal to the main non-volatile memory 240 and exchange data with the main non-volatile memory 240.

The storage controller 210 may include a special function register (SFR) 219. The SFR 219 may include storage regions for storing parameter values indicating connection characteristics between the storage device 200 and the host 100 according to an interface protocol. Meanwhile, the interface protocol may not support access of the host 100 to the SFR 219.

The main non-volatile memory 240 may perform a read operation, a program operation, and an erase operation under the control of the storage controller 210. The main non-volatile memory 240 may include a NAND flash memory. However, in the present disclosure, the main non-volatile memory 240 is not limited to the NAND flash memory and the main non-volatile memory 240 may include at least one of various non-volatile memories such as a PRAM, an MRAM, an RRAM, and a ferroelectric random access memory (FeRAM).

According to an example embodiment of the present disclosure, the storage device 200 may receive a parameter change command from the host 100 through an interface protocol for communicating with the host 100. The storage controller 210 may perform interface tuning by storing a parameter value in a storage region of the SFR 219 in response to the parameter change command received from the host 100.

Figure 6:
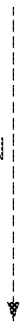

FIGS. 4 to 6 are diagrams illustrating a parameter change command according to an example embodiment of the present disclosure.

FIG. 4 is a diagram exemplifying a data structure of a parameter change command.

The parameter change command may have a form supported by an interface protocol for communication between a storage device and a host. For example, the parameter change command may have a packet form.

Referring to FIG. 4, the parameter change command may include a signature field, a target power cycle field, and a descriptor field.

The signature field may indicate the validity of the parameter change command. For example, the storage device may perform interface tuning using the parameter change command only when the signature field of the parameter change command includes a valid signature.

The target power cycle field may indicate an expiration condition of the parameter change command. Specifically, when receiving the parameter change command from the host, the storage device may store the parameter change command therein and perform interface tuning based on optimized parameters using the parameter change command even upon a power-on reset of the storage device.

According to an example embodiment of the present disclosure, the target power cycle field may include information on the number of times of power cycling as an expiration condition of the parameter change command. The power cycle may refer to a cycle in which the storage device is powered on after being powered off, and the number of times of power cycling may refer to the number of times the storage device is powered on after being powered off.

After the storage device receives the parameter change command, the parameter change command may expire when the power cycle is repeated the number of times indicated for power cycling in the target power cycle field. The expiration of the parameter change command may mean that the storage device no longer performs interface tuning according to the parameter change command upon a power-on reset of the storage device.

If the storage device performs interface tuning using a parameter change command including incorrect parameter values, it may not be possible for the storage device and the host to normally communicate with each other. According to an example embodiment of the present disclosure, a parameter change command including incorrect parameter values may expire under its expiration condition. Accordingly, after the parameter change command expires, communication between the storage device and the host may be resumed.

Meanwhile, it is exemplified in FIG. 4 that two target power cycle fields, each having a size of 4 bytes, indicate upper 4 bytes and lower 4 bytes, respectively, for a value of the number of times of power cycling. However, the size and the number of target power cycle fields are not limited to what is exemplified in FIG. 4.

In the example of FIG. 4, the parameter change command may include N descriptor fields (where N is a natural number). Each of the descriptor fields may include information for specifying a target parameter to be changed and a value to which the target parameter is to be changed. That is, the parameter change command exemplified in FIG. 4 may change values of the N target parameters.

FIG. 5 is a diagram illustrating a descriptor included in a parameter change command in more detail.

Referring to FIG. 5, descriptor fields may include a group field, an address field, and a value field. The group field and the address field may specify a target parameter, and the value field may indicate a value to which the target parameter is to be changed.

Specifically, the group field may refer to a code block affected by the target parameter. The code block may refer to a set of firmware source codes, for example, a function. The target parameter may be a local parameter applied within a specific function, and the group field may specify a code block to which the target parameter is applied.

The address field may include an address of a region in which the target parameter is stored for the SFR, that is, an SFR address. In an implementation, the SFR address may be a memory map address, which is an address allocated to allow the storage controller to access the SFR.

The value field may include a value of the target parameter to be written into the region indicated by the SFR address.

Referring to FIG. 4, the parameter change command may include a plurality of descriptor fields. In a case where the parameter change command includes a plurality of descriptor fields, the storage device may change values of a plurality of target parameters by sequentially executing the plurality of descriptors in response to the parameter change command.

FIG. 6 is a diagram illustrating an order in which descriptors are executed according to an example embodiment of the present disclosure.

FIG. 6 exemplifies N descriptors (where N is a natural number) included in the parameter change command of FIG. 4 and groups, addresses, and parameter values included in the respective descriptors.

According to an example embodiment of the present disclosure, the storage device may execute the descriptors in an order listed in a packet. In the example of FIG. 6, the storage device may execute descriptor no. 1 to descriptor no. N, for example, in an order in which descriptor nos. 1 and 2 are executed first to change values of target parameters included in group no. 0 and then descriptor no. 3 is executed to change a value of a target parameter included in group no. 1.

In the parameter change command, the plurality of descriptors may be listed in an order capable of efficiently changing the plurality of target parameters. For example, the plurality of descriptors may be listed in group order. For example, the group order may be an order in which code blocks are executed with respect to firmware source codes for controlling the connection with the host. To change target parameters applied to the code blocks executed in the predetermined order, the storage device may execute the plurality of descriptors, which are listed in the group order, simply in an order listed. Accordingly, an amount of computation required to change the plurality of target parameters may be reduced.

Figure 7:
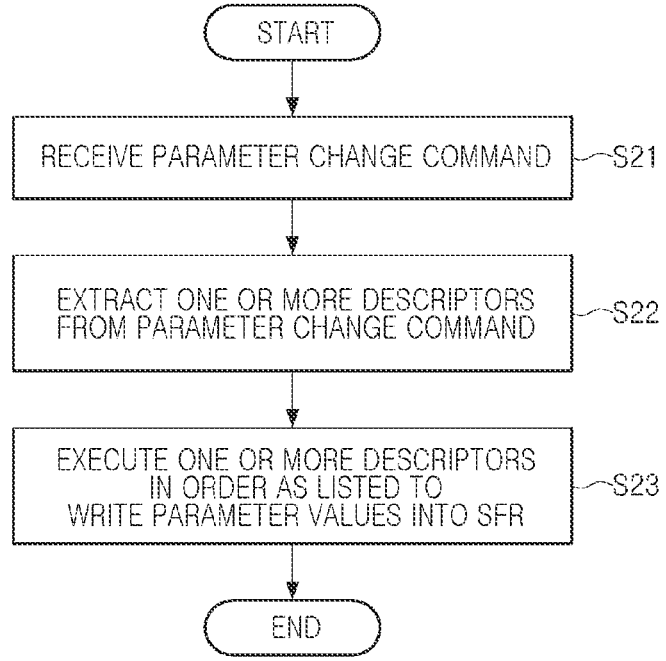
FIG. 7 is a flowchart illustrating an operation of the storage device according to an example embodiment of the present disclosure.

FIG. 7 is a flowchart illustrating an operation of the storage device according to an example embodiment of the present disclosure.

In step S21, the storage controller included in the storage device may receive a parameter change command from the host. As described with reference to FIG. 4, the parameter change command may include validity information, expiration conditions, and one or more descriptors.

In step S22, the storage controller may extract one or more descriptors from the parameter change command. As described with reference to FIG. 5, each of the one or more descriptors may include a group in which a target parameter is included, an address indicating a region in which the target parameter is stored for an SFR, and a value of the target parameter.

In step S23, the storage controller may execute the extracted one or more descriptors in an order as listed to write the parameter values into the SFR. As described with reference to FIG. 6, the one or more descriptors in the parameter change command may be listed in group order.

According to the example embodiment of the present disclosure described with reference to FIGS. 3 to 7, the storage device may support a parameter change command. The host may control the storage device to change a value of a parameter included in the SFR, which the host is not allowed to access, through an interface protocol by using the parameter change command. The storage device may perform interface tuning by acquiring optimal parameter values determined externally, for example by a manufacturer, and writing the optimal parameter values into regions of the SFR, and the storage device and the host may transmit and receive signals quickly and accurately.

Meanwhile, as described above, the storage device may store a parameter change command received from the host therein and may perform interface tuning using the parameter change command upon a power-on reset of the storage device. According to an example embodiment of the present disclosure, the storage device may store a parameter change command in a sub non-volatile memory storing data required for an operation of the storage controller, instead of a boot region of the main non-volatile memory. Hereinafter, a storage device according to an example embodiment of the present disclosure will be described in more detail with reference to FIGS. 8 to 10.

Figure 8:
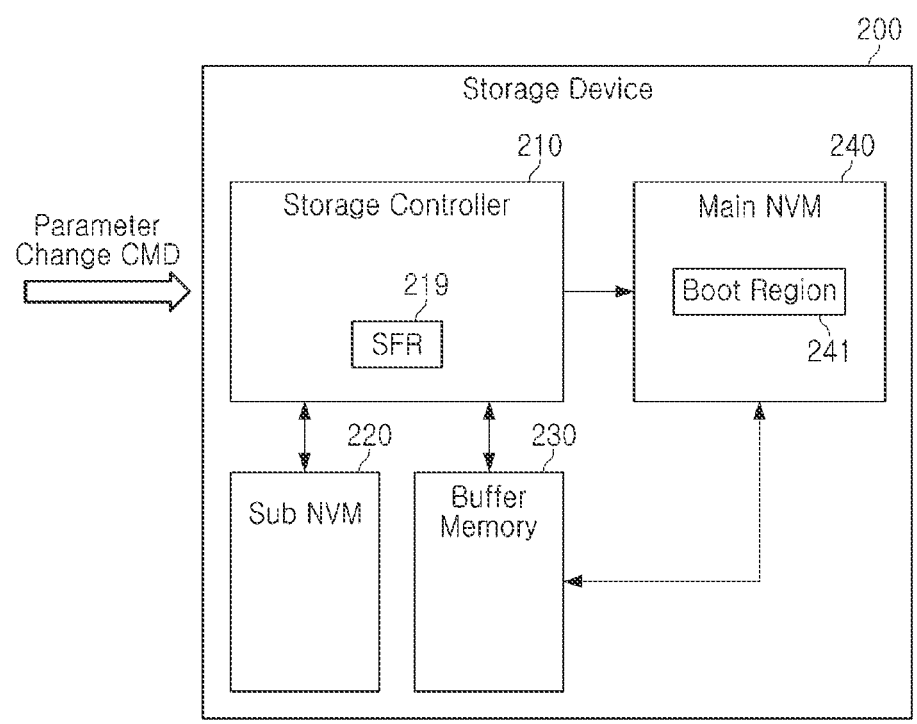
FIG. 8 is a block diagram illustrating a storage device according to an example embodiment of the present disclosure.

FIG. 8 is a block diagram illustrating a storage device according to an example embodiment of the present disclosure.

A storage device 200 may include a storage controller 210, a sub non-volatile memory 220, a buffer memory 230, and a main non-volatile memory 240. The storage controller 210 and the main non-volatile memory 240 may correspond to the storage controller 210 and the main non-volatile memory 240 described with reference to FIG. 3.

The storage controller 210 may include an SFR 219. As described with reference to FIG. 3, the SFR 219 may include parameters defining connection characteristics with respect to the storage device and a host.

The main non-volatile memory 240 may further include a boot region 241 as well as a normal region for storing data from the host. The boot region 241 may store a boot loader, which is data required for booting the storage device 200. The boot region 241 may be accessed by the storage controller 210 upon a power-on reset of the storage device 200. The boot region 241 may also be referred to as a boot block, a boot sector, or the like and may have a limited size of, for example, about 4 KB.

The sub non-volatile memory 220 may store data required for an operation of the storage controller 210. For example, the sub non-volatile memory 220 may include an electrically erasable programmable read-only memory (EEPROM), a NOR flash memory, a serial NOR (SNOR) flash memory, or the like. In an implementation, the sub non-volatile memory 220 may have a size of several megabytes (MB).

The buffer memory 230 may buffer data to be programmed into the main non-volatile memory 240 or buffer data read from the main non-volatile memory 240. The buffer memory 230 may be implemented as a volatile memory. For example, the buffer memory 230 may be implemented as a static random access memory (SRAM), a dynamic random access memory (DRAM), or the like.

Meanwhile, when the main non-volatile memory 240 is a NAND flash memory, it may be difficult for the storage controller 210 to read and write data on a certain address from and into the main non-volatile memory 240. For example, in the NAND flash memory, data may be read in units of pages, each being a set of memory cells connected to one word line. The storage controller 210 may control the data stored in the main non-volatile memory 240 to be read in units of pages, and the data stored in the main non-volatile memory 240 may be used by the storage controller 210 after being buffered by the buffer memory 230.

On the other hand, the storage controller 210 may read and write data on a certain address from and into the sub non-volatile memory 220. Specifically, the storage controller 210 may select one memory cell by specifying a row address and a column address in the sub non-volatile memory 220 using an external address.

As described above, a parameter change command may be stored in the storage device 200 and interface tuning may be performed using the parameter change command upon a power-on reset of the storage device 200, that is, during a booting operation. It is preferable that the parameter change command is accessed quickly during the booting operation. However, the size of the boot region 241 may be limited and to relax the size limitation of the boot region 241, it may be needed to significantly modify the design of the firmware in the storage device.

Thus, it may be difficult to store a parameter change command together with a boot loader in the boot region 241 and load the parameter change command together with the boot loader during the booting operation. In addition, if a parameter change command is stored in the normal region of the main non-volatile memory 240 and both the boot region 241 and the normal region are accessed during a booting operation, a booting completion time may be delayed.

According to an example embodiment of the present disclosure, the storage controller 210 may store a parameter change command in the sub non-volatile memory 220 and acquire the parameter change command from the sub non-volatile memory 220 during a booting operation. The main non-volatile memory 240 may be difficult for the storage controller 210 to directly access, whereas the sub non-volatile memory 220 may be easily accessed by the storage controller 210 using an address. Accordingly, the storage controller 210 may quickly acquire a parameter change command and quickly perform interface tuning during a booting operation.

Hereinafter, a method in which the storage device 200 stores a parameter change command and uses the parameter change command upon a power-on reset of the storage device 200 according to an example embodiment of the present disclosure will be described in detail with reference to FIGS. 9 and 10.

Figure 9:
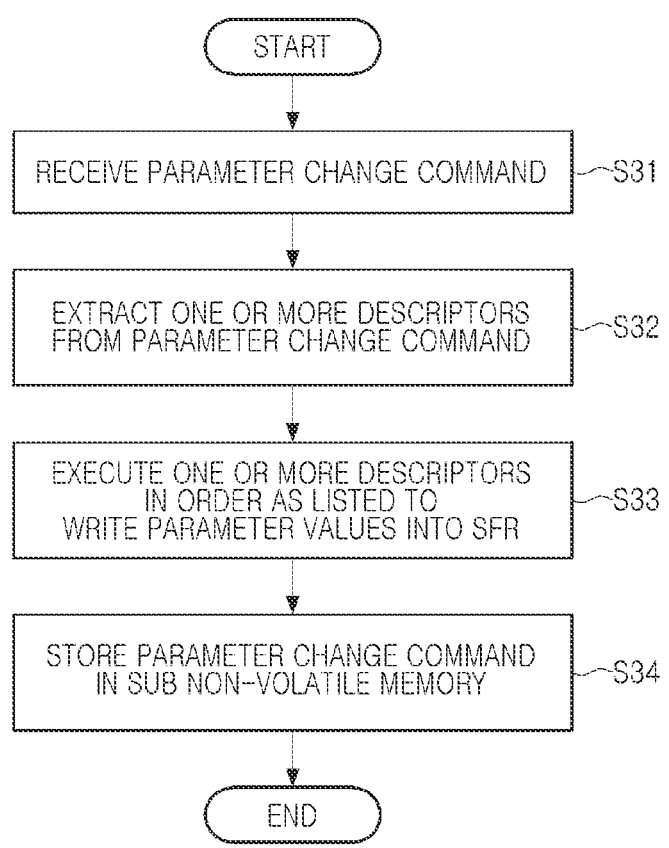
FIGS. 9 and 10 are flowcharts respectively illustrating an operation of the storage device according to an example embodiment of the present disclosure.
Figure 10:
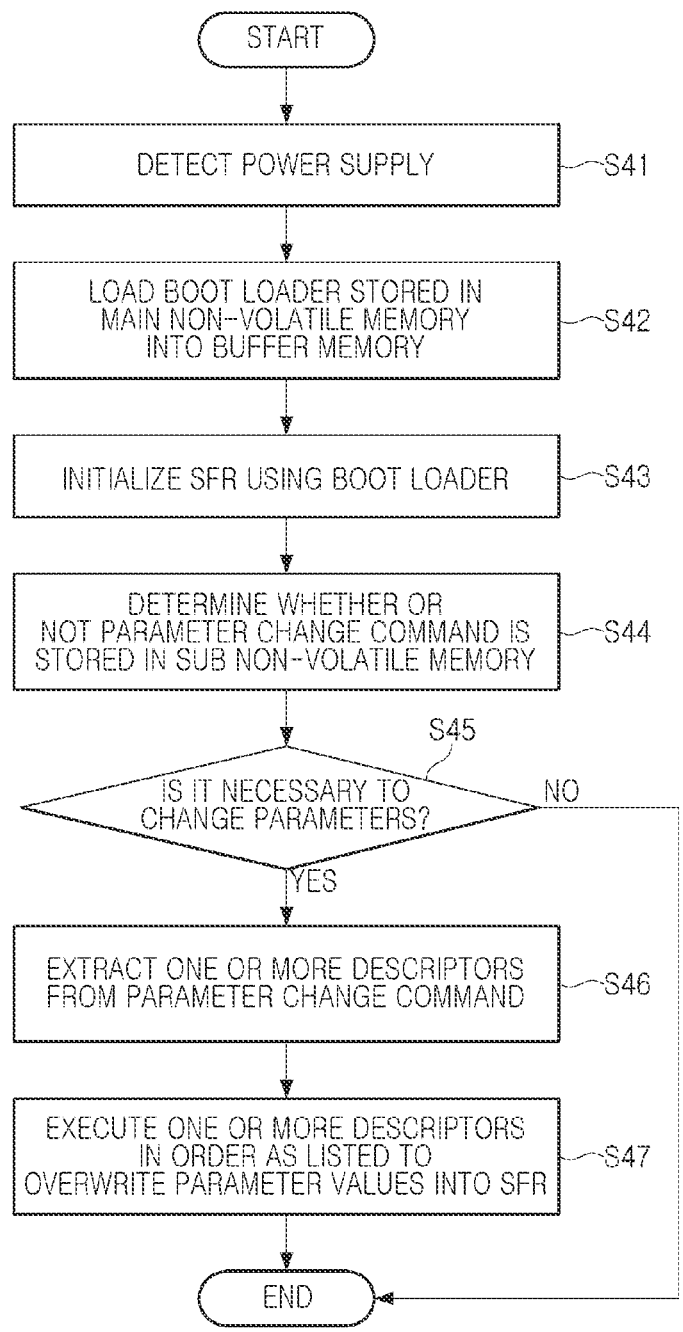

FIGS. 9 and 10 are flowcharts respectively illustrating an operation of the storage device according to an example embodiment of the present disclosure.

FIG. 9 is a flowchart illustrating an operation performed by the storage device in response to a parameter change command Steps S31 to S33 in FIG. 9 may be like steps S21 to S23 described with reference to FIG. 7.

After performing interface tuning using the parameter change command, the storage controller may store the parameter change command in the sub non-volatile memory in step S34. The stored parameter change command may be used for interface tuning upon a power-on reset of the storage device.

FIG. 10 is a flowchart illustrating an operation performed by the storage device upon a power-on reset thereof.

When the storage device detects power supply in step S41, the storage device may perform a power-on reset operation in steps S42 to S47.

In step S42, the storage device may load a boot loader stored in the main non-volatile memory into the buffer memory. For example, a processor included in the storage controller may control the main non-volatile memory to load data in a predetermined size from a predetermined address of the main non-volatile memory into the buffer memory.

In step S43, the storage device may initialize the SFR using the boot loader loaded into the buffer memory. For example, the boot loader may include initial parameter values before interface tuning is performed and the storage controller may initialize connection characteristic parameters by writing the initial parameter values to the SFR.

In step S44, the storage device may determine whether a parameter change command is stored in the sub non-volatile memory. For example, the storage controller may directly access the sub non-volatile memory using an address, not through the buffer memory. Since the parameter change command can be stored in the sub non-volatile memory, the storage controller may quickly determine whether the parameter change command is stored.

In step S45, the storage device may determine whether it is necessary to change the initialized connection characteristic parameters. For example, when a parameter change command including a valid signature is stored in the sub non-volatile memory, if the parameter change command has not expired, the storage controller may determine that it is necessary to change the parameters. On the other hand, when a parameter change command is not stored in the sub non-volatile memory, the stored command is invalid or the stored command has expired, the storage controller may determine that it is not necessary to change the parameters.

When it is necessary to change the parameters ("Yes" in step S45), the storage controller may extract one or more descriptors from the parameter change command in step S46. Then, in step S47, the storage controller may execute the one or more descriptors in an order listed, such that optimal parameter values are written into regions where the initial parameter values are stored of the SFR.

According to an example embodiment of the present disclosure, the storage device may support a parameter change command complying with a predetermined interface protocol. By receiving the parameter change command, the storage device may acquire optimal parameter values to change the parameter values in the SFR that the host is not allowed to access. Accordingly, the host and the storage device may transmit and receive signals quickly and accurately.

The storage device may store a parameter change command in an auxiliary non-volatile memory that the controller is allowed to directly access. Even when it is difficult for the storage device to store the parameter change command in the boot region of the main non-volatile memory, the storage controller may quickly access the parameter change command upon a power-on reset of the storage device. Accordingly, interface tuning may be quickly performed upon the power-on reset of the storage device.

Hereinafter, an example of a computing system to which an example embodiment of the present disclosure is applied will be described in detail with reference to FIGS. 11 to 14.

Figure 11:
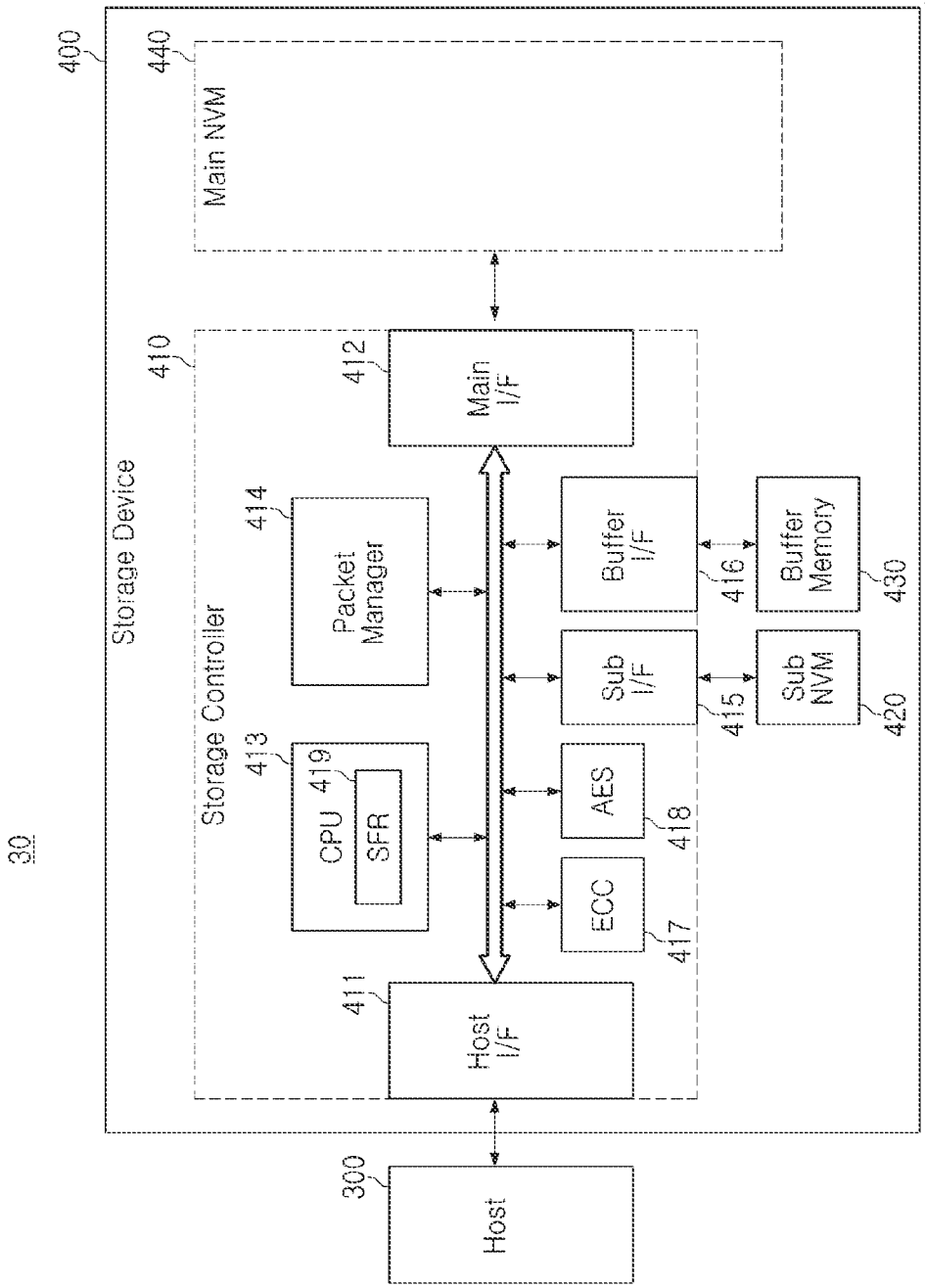
FIG. 11 is a block diagram illustrating a computing system according to an example embodiment of the present disclosure.

FIG. 11 is a block diagram illustrating a computing system according to an example embodiment of the present disclosure.

The computing system 30 may include a host 300 and a storage device 400. In addition, the storage device 400 may include a storage controller 410, a sub non-volatile memory 420, a buffer memory 430, and a main non-volatile memory 440. The host 300 and the storage device 400 may be like the host 100 and the storage device 200 described with reference to FIG. 1. Also, the storage controller 410, the sub non-volatile memory 420, the buffer memory 430, and the main non-volatile memory 440 may be like the storage controller 210, the sub non-volatile memory 220, the buffer memory 230, and the main non-volatile memory 240 described with reference to FIG. 8.

The storage device 400 may include storage media for storing data according to a request from the host 300. As an example, the storage device 400 may include at least one of an SSD, an embedded memory, and a removable external memory. When the storage device 400 is an SSD, the storage device 400 may be a device conforming to the NVMe standard. When the storage device 400 is an embedded memory or an external memory, the storage device 400 may be a device conforming to a UFS standard or an eMMC standard. The host 300 and the storage device 400 may generate and transmit packets according to the respective standard protocols employed.

The main non-volatile memory 440 may retain stored data even though power is not supplied thereto. The main non-volatile memory 440 may store data provided from the host 300 through a program operation and may output data stored in the main non-volatile memory 440 through a read operation.

When the main non-volatile memory 440 includes a flash memory, the flash memory may include a 2D NAND memory array or a 3D (or vertical) NAND (VNAND) memory array. As another example, the storage device 400 may include various other types of non-volatile memories. Examples of the various other types of non-volatile memories applicable to the storage device 400 may include an MRAM, a spin-transfer torque MRAM, a conductive bridging RAM (CBRAM), an FeRAM, a PRAM, and an RRAM.

The storage controller 410 may control the main non-volatile memory 440 in response to a request from the host 300. For example, the storage controller 410 may provide data read from the main non-volatile memory 440 to the host 300 and store data provided from the host 300 in the main non-volatile memory 440. For such operations, the storage controller 410 may support the main non-volatile memory 440 to perform a read operation, a program operation, an erase operation, and the like.

The sub non-volatile memory 420 may store data necessary for an operation of the storage controller 410. The sub non-volatile memory 420 may be directly accessed by the storage controller 410 using an address. The sub non-volatile memory 420 may include an EEPROM, a NOR flash memory, an SNOR flash memory, or the like.

The buffer memory 430 may buffer data to be programmed in the main non-volatile memory 440 or buffer data read from the main non-volatile memory 440.

The storage controller 410 may include a host interface 411, a main memory interface 412, and a central processing unit (CPU) 413. In addition, the storage controller 410 may further include a packet manager 414, a sub memory interface 415, a buffer memory interface 416, an error correction code (ECC) engine 417, and an advanced encryption standard (AES) engine 418. The storage controller 410 may further include a working memory (not shown) into which a flash translation layer (FTL) is loaded, and the CPU 413 may execute the flash translation layer to control the operations of the main non-volatile memory 440 for writing and reading data.

The host interface 411 may transmit and receive packets to and from the host 300 through a predetermined interface protocol. The packet transmitted from the host 300 to the host interface 411 may include a command, data to be written into the main non-volatile memory 440 or the like, and the packet transmitted from the host interface 411 to the host 300 may include a response to the command, data read from the main non-volatile memory 440, or the like.

The main memory interface 412 may transmit data to be written into the main non-volatile memory 440 to the main non-volatile memory 440 or may receive data read from the main non-volatile memory 440. Such a main memory interface 412 may be implemented to comply with a standard protocol such as a toggle or an open NAND flash interface (ONFI).

The flash translation layer driven by the CPU 413 may perform several functions such as address mapping, wear-leveling, and garbage collection. The address mapping is an operation of converting a logical address received from the host 300 into a physical address used to store data in the main non-volatile memory 440. The wear-leveling is a technology for preventing an excessive deterioration of a specific block by allowing blocks in the main non-volatile memory 440 to be uniformly used and may be implemented through, for example, a firmware technology for balancing erase counts of physical blocks. The garbage collection is a technology for securing an available capacity of the main non-volatile memory 440 by copying valid data of a block to a new block and then erasing the existing block.

Meanwhile, the CPU 413 may include an SFR 419 for storing parameter values used for an operation of the storage device 400. For example, the SFR 419 may store parameters indicating connection characteristics between the storage device and the host.

The packet manager 414 may generate a packet according to an interface protocol predetermined between the host 300 and the storage device 400 or parse various information through a packet received from the host 300.

The sub memory interface 415 may transmit and receive data to and from the sub non-volatile memory 420 disposed outside the storage controller 410. In addition, the buffer memory interface 416 may transmit and receive data to and from the buffer memory 430 disposed outside the storage controller 410. In the example of FIG. 11, the sub non-volatile memory 420 and the buffer memory 430 are disposed outside the storage controller 410 but may be disposed inside the storage controller 410.

The ECC unit 417 may perform an error detection and correction function for read data read from the main non-volatile memory 440. More specifically, the ECC unit 417 may generate parity bits for write data to be written into the main non-volatile memory 440 and the parity bits generated as described above may be stored in the main non-volatile memory 440 together with the write data. At the time of reading data from the main non-volatile memory 440, the ECC unit 417 may correct an error of the read data using the parity bits read from the main non-volatile memory 440 together with the read data and output the read data of which the error has been corrected.

The AES engine 418 may perform at least one of an encryption operation and a decryption operation for data input to the storage controller 410 using a symmetric-key algorithm. For example, the AES engine 418 may decode a command received by the storage controller 410 according to a security protocol.

Meanwhile, the storage controller 410 may further include an encryption engine for encrypting data stored in the main non-volatile memory 440. However, the storage controller 410 may store data stored in the sub non-volatile memory 420 in plain text without encryption. According to an example embodiment of the present disclosure, the storage controller 410 may directly store the command received according to the security protocol in the sub non-volatile memory 420.

Since the command received according to the security protocol may be an encrypted command, even though the command is directly stored in the sub non-volatile memory 420 without additional encryption, the security of descriptors included in the command may be maintained. The storage controller 410 may acquire the encrypted command from the sub non-volatile memory 420 upon a power-on reset of the storage device, decrypt the encrypted command, and then perform interface tuning using the decrypted command.

Figure 12:
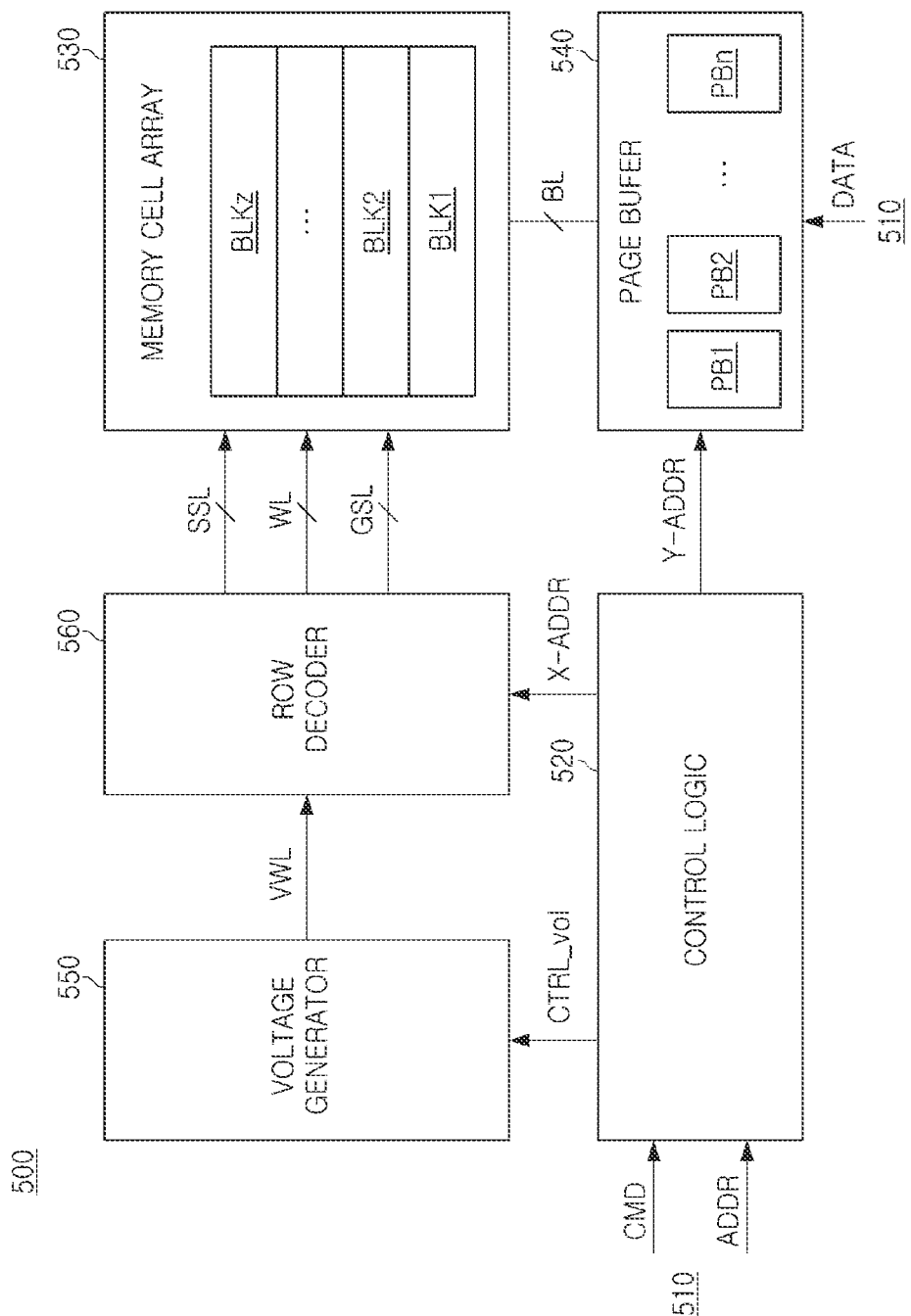
FIG. 12 is a block diagram illustrating an example of a main non-volatile memory of FIG. 11.

FIG. 12 is a block diagram illustrating an example of the main non-volatile memory of FIG. 11. Referring to FIG. 12, a main non-volatile memory 500 may include a control logic circuit 520, a memory cell array 530, a page buffer 540, a voltage generator 550, and a row decoder 560. Although not illustrated in FIG. 15, the main non-volatile memory 500 may further include a memory interface circuit 510 illustrated in FIG. 12 and may further include a column logic, a pre-decoder, a temperature sensor, a command decoder, an address decoder, and the like.

The control logic circuit 520 may generally control various operations within the main non-volatile memory 500. The control logic circuit 520 may output various control signals in response to a command CMD and/or an address ADDR from the memory interface circuit 510. For example, the control logic circuit 520 may output a voltage control signal CTRL_vol, a row address X-ADDR, and a column address Y-ADDR.

The memory cell array 530 may include a plurality of memory blocks BLK1 to BLKz (z is a positive integer), and each of the plurality of memory blocks BLK1 to BLKz may include a plurality of memory cells. The memory cell array 530 may be connected to the page buffer unit 540 through bit lines BL and may be connected to the row decoder 560 through word lines WL, string selection lines SSL, and ground selection lines GSL.

In an example embodiment, the memory cell array 530 may include a three-dimensional (3D) memory cell array and the 3D memory cell array may include a plurality of NAND strings. Each of the NAND strings may include memory cells vertically stacked on a substrate while being connected to word lines respectively. U.S. Pat. Nos. 7,679,133, 8,553,466, 8,654,587, 8,559,235, and U.S. Patent Application Publication No. 2011/0233648 are herein incorporated by reference. In an example embodiment, the memory cell array 530 may include a two-dimensional (2D) memory cell array and the 2D memory cell array may include a plurality of NAND strings arranged along row and column directions.

The page buffer 540 may include a plurality of page buffers PB1 to PBn (n is an integer of 3 or more), and the plurality of page buffers PB1 to PBn may be connected to the memory cells through a plurality of bit lines BL, respectively. The page buffer 540 may select one or more of the bit lines BL in response to the column address Y-ADDR. The page buffer 540 may operate as a write driver or a sense amplifier according to an operation mode. For example, during a program operation, the page buffer 540 may apply a bit line voltage corresponding to data (DATA), received from memory interface circuit 510, to be programmed to the selected bit line. During a read operation, the page buffer 540 may detect a current or a voltage of the selected bit line to detect data stored in the memory cell.

The voltage generator 550 may generate various types of voltages for performing program, read, and erase operations based on voltage control signals CTRL_vol. For example, the voltage generator 550 may generate a program voltage, a read voltage, a program verification voltage, an erase voltage, or the like, as a word line voltage VWL.

The row decoder 560 may select one of the plurality of word lines WL and one of the plurality of string selection lines SSL in response to the row address X-ADDR. For example, the row decoder 560 may apply the program voltage and the program verification voltage to the selected word line during the program operation and may apply the read voltage to the selected word line during the read operation.

Figure 13:
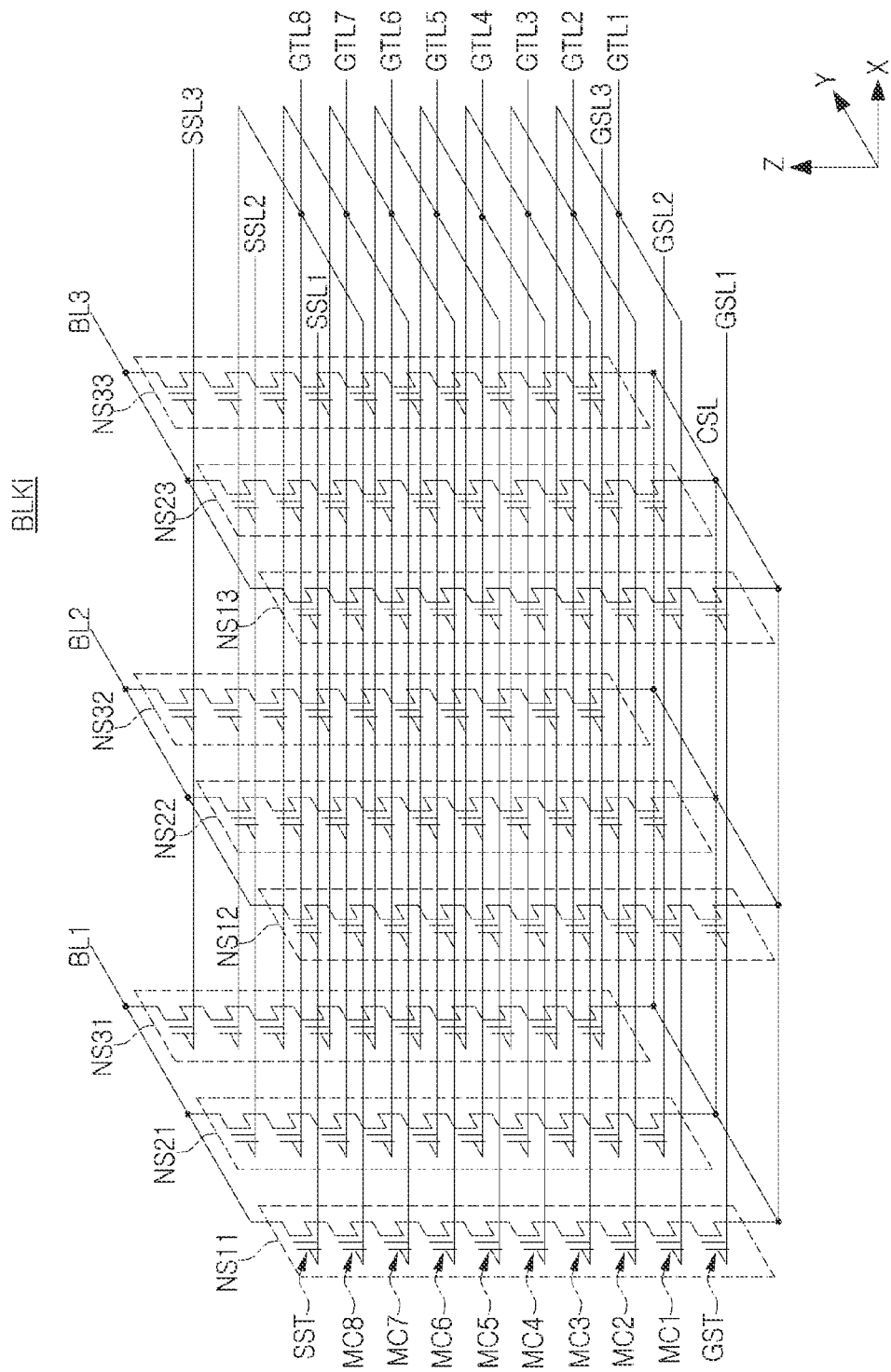
FIG. 13 is a diagram illustrating a three-dimensional vertical NAND (3D V-NAND) structure applicable to the storage device according to an example embodiment of the present disclosure.

FIG. 13 is a diagram illustrating a 3D V-NAND structure applicable to the storage device according to an example embodiment of the present disclosure.

When the non-volatile memory of the storage device is implemented as a 3D V-NAND type flash memory, each of a plurality of memory blocks constituting the non-volatile memory may be represented by an equivalent circuit as illustrated in FIG. 13.

A memory block BLKi illustrated in FIG. 13 is a three-dimensional memory block formed in a three-dimensional structure on a substrate. For example, a plurality of memory NAND strings included in a memory block BLKi may be formed in a direction perpendicular to the substrate.

Referring to FIG. 13, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , and MC8, and a ground selection transistor GST. Although it is illustrated in FIG. 13 that each of the plurality of memory NAND strings NS11 to NS33 includes eight memory cells MC1, MC2, . . . , and MC8, the number of memory cells included in each memory NAND string is not necessarily limited thereto.

The string selection transistor SST may be connected to a corresponding string selection line SSL1, SSL2, or SSL3. The plurality of memory cells MC1, MC2, . . . , and MC8 may be connected to corresponding gate lines GTL1, GTL2, . . . , and GTL8, respectively. The gate lines GTL1, GTL2, . . . , and GTL8 may correspond to word lines, and some of the gate lines GTL1, GTL2, . . . , and GTL8 may correspond to dummy word lines. The ground selection transistor GST may be connected to a corresponding ground selection line GSL1, GSL2, or GSL3. The string selection transistors SST may be connected to corresponding bit lines BL1, BL2, and BL3, respectively, and the ground selection transistors GST may be connected to the common source line CSL.

Word lines (e.g., WL1) having the same height may be connected to each other in common, while the ground selection lines GSL1, GSL2, and GSL3 may be separated from each other and the string selection lines SSL1, SSL2, and SSL3 may be separated from each other. Although it is illustrated in FIG. 13 that the memory block BLK is connected to the eight gate lines GTL1, GTL2, . . . , and GTL8 and the three bit lines BL1, BL2, and BL3, the respective numbers of gate lines and bit lines to which the memory block is connected are not necessarily limited thereto.

Figure 14:
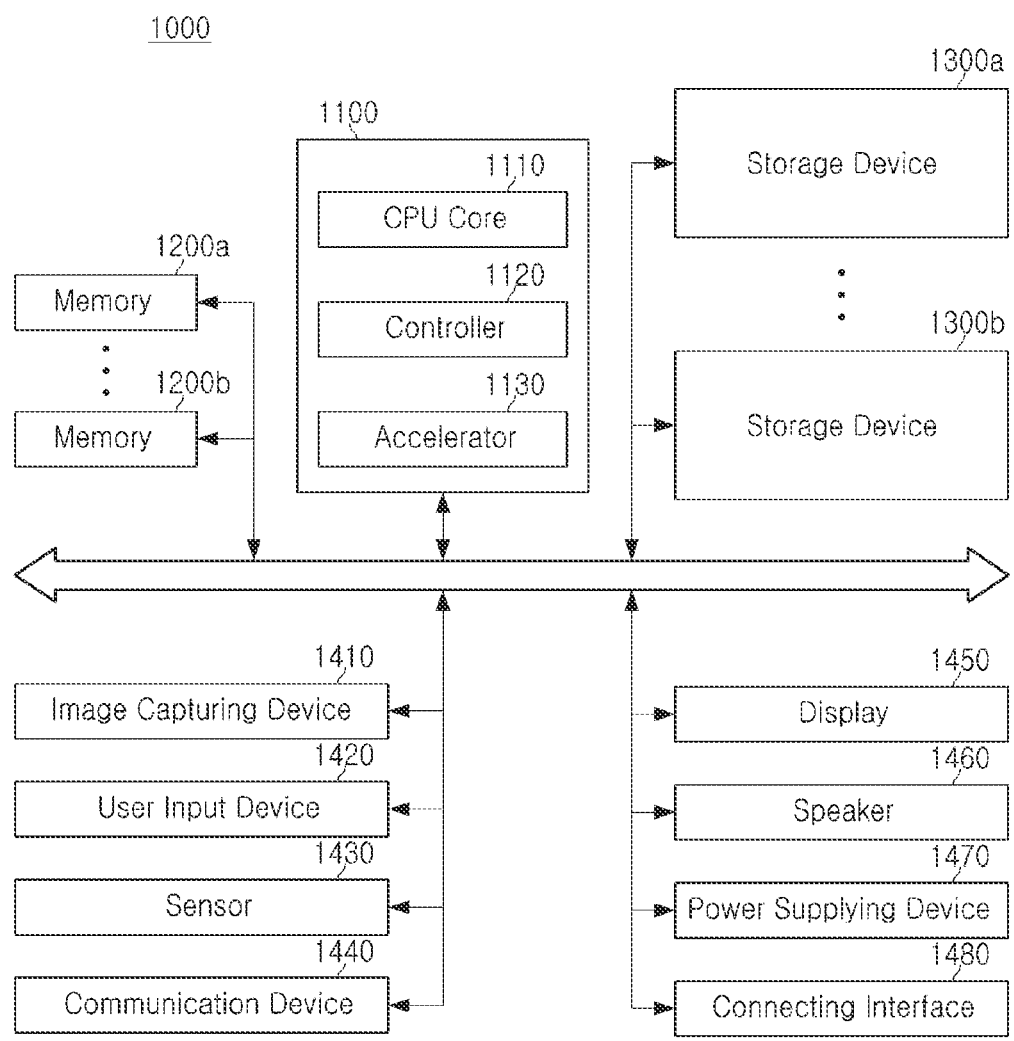
FIG. 14 is a diagram illustrating a system to which the storage device according to an example embodiment of the present disclosure is applied.

FIG. 14 is a diagram illustrating a system 1000 to which the storage device according to an example embodiment of the present disclosure is applied.

The system 1000 of FIG. 14 may be basically a mobile system such as a mobile phone, a smartphone, a tablet personal computer (PC), a wearable device, a healthcare device, or an Internet of things (IOT) device. However, the system 1000 of FIG. 14 is not necessarily limited to the mobile system and may be a personal computer, a laptop computer, a server, a media player, an automotive device such as a navigation system, or the like.

Referring to FIG. 14, the system 1000 may include a main processor 1100, memories 1200a and 1200b, and storage devices 1300a and 1300b and may further include one or more of an image capturing device 1410, a user input device 1420, a sensor 1430, a communication device 1440, a display 1450, a speaker 1460, a power supplying device 1470, and a connecting interface 1480.

The main processor 1100 may control an overall operation of the system 1000 and more specifically operations of the other components constituting the system 1000. Such a main processor 1100 may be implemented as a general-purpose processor, a dedicated processor, an application processor, or the like.

The main processor 1100 may include one or more CPU cores 1110 and may further include a controller 1120 for controlling the memories 1200a and 1200b and/or the storage devices 1300a and 1300b. In an example embodiment, the main processor 1100 may further include an accelerator 1130 that is a dedicated circuit for high-speed data operations such as artificial intelligence (AI) data operations. Such an accelerator 1130 may include a graphics processing unit (GPU), a neural processing unit (NPU), a data processing unit (DPU), and/or the like and may also be implemented as a separate chip physically independent from the other components of the main processor 1100.

The memories 1200a and 1200b may be used as main memory units of the system 1000 and may include volatile memories such as an SRAM and/or a DRAM but may also include non-volatile memories such as a flash memory, a PRAM, and/or an RRAM. The memories 1200a and 1200b may be implemented in the same package as the main processor 1100.

The storage devices 1300a and 1300b may function as non-volatile storage devices that store data regardless of whether power is supplied thereto and may have a larger storage capacity than the memories 1200a and 1200b. The storage devices 1300a and 1300b may include storage controllers (not illustrated) and non-volatile memories (NVMs) (not illustrated) storing data under the control of the storage controllers, respectively. The non-volatile memories may include flash memories having a 2D structure or a 3D V-NAND structure but may also include other types of non-volatile memories such as a PRAM and/or an RRAM.

The storage devices 1300a and 1300b may be included in the system 1000 in a state where they are physically separated from the main processor 1100 or may be implemented in the same package as the main processor 1100. In addition, the storage devices 1300a and 1300b may be of a solid state device (SSD) type or a memory card type and may be detachably coupled to the other components of the system 1000 through an interface such as the connecting interface 1480, which will be described below. Such storage devices 1300a and 1300b may be devices to which a standard protocol such as UFS, eMMC, or NVMe is applied, but are not necessarily limited thereto.

According to an example embodiment of the present disclosure, the storage devices 1300a and 1300b may support parameter change commands complying with a predetermined interface protocol. The main processor 1100 may provide to the storage devices 1300a and 1300b parameter change commands including optimal parameter values for connection characteristics between the main processor 1100 and the storage devices 1300a and 1300b, thereby easily changing parameter values stored in the storage devices 1300a and 1300b. Accordingly, signal transmission quality between the main processor 1100 and the storage devices 1300a and 1300b may be improved.

The image capturing device 1410 may capture a still image or a moving image and may be a camera, a camcorder, a webcam, and/or the like.

The user input device 1420 may receive various types of data input from a user of the system 1000 and may be a touch pad, a keypad, a keyboard, a mouse, a microphone, and/or the like.

The sensor 1430 may detect various types of physical quantities that may be acquired from the outside of the system 1000 and convert the detected physical quantities into electrical signals. Such a sensor 1430 may be a temperature sensor, a pressure sensor, an illuminance sensor, a position sensor, an acceleration sensor, a biosensor, a gyroscope sensor, and/or the like.

The communication device 1440 may transmit and receive signals to and from other devices outside the system 1000 according to various communication protocols. Such a communication device 1440 may be implemented as an antenna, a transceiver, a modem, and/or the like.

The display 1450 and the speaker 1460 may function as output devices that output visual information and auditory information, respectively, to a user of the system 1000.

The power supplying device 1470 may appropriately convert power supplied from a battery (not shown) built in the system 1000 and/or an external power source and supply the converted power to each of the components of the system 1000.

The connecting interface 1480 may provide a connection between the system 1000 and an external device connected to the system 1000 to exchange data with the system 1000. The connecting interface 1480 may be implemented in various interface types such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an institute of electrical and electronic engineers (IEEE) 1394, a USB, an SD card, an MMC, an eMMC, a UFS, an embedded UFS (eUFS), and a CF card interface.

The present disclosure is not limited by the example embodiments described above and the accompanying drawings.

The storage device according to an embodiment of the present disclosure may support a parameter change command to externally change a value of a parameter stored in the SFR that the host is not allowed to access through the interface protocol. Accordingly, the storage device may easily perform interface tuning by applying the externally provided parameter value.

The storage device according to an embodiment of the present disclosure may store a parameter change command in the sub non-volatile memory that allows the storage controller to directly access, instead of the boot region of the main non-volatile memory. Accordingly, the storage device may perform interface tuning by quickly loading the parameter change command from the sub non-volatile memory upon a power-on reset thereof.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While example embodiments have been illustrated and described above, it will be apparent to those skilled in the art that modifications and variations could be made without departing from the scope of the present disclosure as defined by the appended claims.

What is claimed is:

1. A storage device comprising:
a main non-volatile memory; and
a controller configured to communicate with a host according to a predetermined interface protocol and to control the main non-volatile memory, wherein:
the controller includes a special function register (SFR) storing parameters indicating connection characteristics for signal transmission between the storage device and the host, and
the controller is configured to receive a parameter change command according to the interface protocol from the host, extract one or more descriptors, respectively including an SFR address and a parameter value corresponding to a target parameter configured to change, from
the parameter change command, and tune an interface by executing the one or more descriptors to write the parameter value into the SFR.

2. The storage device of claim 1, wherein the parameter change command includes expiration condition information of the parameter change command.

3. The storage device of claim 2, wherein:
the expiration condition information includes information on a number of times of power cycling of the storage device, and
after the parameter change command is received from the host, when a power cycle is repeated as many as the number of times of power cycling, the controller expires the parameter change command.

4. The storage device of claim 1, wherein each of the one or more descriptors further includes group information indicating a code block to which the target parameter is applied among firmware source codes for controlling connection with the host.

5. The storage device of claim 1, wherein:
the one or more descriptors are listed based on group information in the parameter change command, and
the controller writes the parameter value into the SFR in an order in which the one or more descriptors are listed in the parameter change command.

6. The storage device of claim 1, further comprising:
a sub non-volatile memory storing data required for an operation of the controller,
wherein the controller stores the parameter change command in the sub non-volatile memory.

7. The storage device of claim 6, wherein the controller initializes the SFR using a boot loader acquired from the main non-volatile memory when power supply is detected, determines whether or not the parameter change command has expired based on expiration condition information of the parameter change command stored in the sub non-volatile memory, extracts the one or more descriptors from the parameter change command when the parameter change command has not expired, and tunes an interface by executing the one or more descriptors to write the parameter value into the SFR.

8. The storage device of claim 6, further comprising:
a buffer memory buffering data read from the main non-volatile memory and then providing the data to the controller, wherein
the controller directly acquires the parameter change command stored in the sub non-volatile memory, not through the buffer memory.

9. The storage device of claim 1, wherein:
the parameter change command is an encrypted command, and
the controller decrypts the encrypted command before extracting the one or more descriptors from the parameter change command.

10. The storage device of claim 9, further comprising:
a sub non-volatile memory storing data required for an operation of the controller, wherein
the controller stores the encrypted command in the sub non-volatile memory.

11. The storage device of claim 1, wherein the interface protocol is a peripheral component interconnect express (PCIe).

12. The storage device of claim 11, wherein the parameter change command is a non-volatile memory express (NVMe) administrator (Admin) command.

13. A storage device comprising:
a main non-volatile memory; and
a controller configured to communicate with a host according to a predetermined interface protocol and to control the main non-volatile memory, wherein:
the controller includes a special function register (SFR) storing parameters indicating connection characteristics for signal transmission between the storage device and the host,
the controller is configured to tune an interface by changing a value of a parameter included in the SFR in response to a parameter change command from the host to extract one or more descriptors including an SFR address and a parameter value, and
the SFR is a region that does not support access by the host under the interface protocol when a power supply is detected.

14. The storage device of claim 13, further comprising:
a sub non-volatile memory allowing the controller direct access thereto using a certain address, wherein the controller stores the parameter change command in the sub non-volatile memory.

15. The storage device of claim 14, wherein the controller initializes the SFR using a boot loader acquired from the main non-volatile memory and tunes an interface by changing the value of the parameter included in the SFR based on the parameter change command when the parameter change command stored in the sub non-volatile memory has not expired.

16. A storage device comprising:
a main non-volatile memory;
a controller configured to communicate with a host using a predetermined interface protocol, to control the main non-volatile memory, the controller including a special function register (SFR) storing parameters indicating connection characteristics for signal transmission between the storage device and the host;

a buffer memory buffering data read from the main non-volatile memory and then providing the data to the controller; and a sub non-volatile memory storing data required for an operation of the controller and directly accessed by the controller using an address, wherein the controller is configured to load a boot loader stored in a boot region of the main non-volatile memory into the buffer memory when power supply is detected, initialize the SFR using the boot loader loaded into the buffer memory, acquire one or more descriptors respectively including an SFR address and a parameter value from the sub non-volatile memory, and tune an interface by executing the descriptors to update the SFR.

17. The storage device of claim 16, wherein when receiving a parameter change command including the one or more descriptors from the host, the controller stores the parameter change command in the sub non-volatile memory.

18. The storage device of claim 17, wherein:
the parameter change command is an encrypted command, and
the controller stores the encrypted command in the sub non-volatile memory and acquires the one or more descriptors by decrypting the encrypted command stored in the sub non-volatile memory.

19. The storage device of claim 17, wherein:
the parameter change command further includes information on a number of times of power cycling, and
after the parameter change command is received, when the storage device repeats a power cycle as many as the number of times of power cycling, the controller expires the parameter change command.

20. The storage device of claim 16, wherein:
the sub non-volatile memory is at least one of a serial NOR (SNOR) memory and an electrically erasable programmable read-only memory (EEPROM), and
the main non-volatile memory is a NAND flash memory.

* * * * *